(12) United States Patent
Cui et al.

(10) Patent No.: US 11,556,401 B2
(45) Date of Patent: **\*Jan. 17, 2023**

(54) METHOD, DEVICE AND COMPUTER PROGRAM PRODUCT FOR OPTIMIZING REMOTE CALL

(71) Applicant: EMC IP Holding Company LLC, Hopkinton, MA (US)

(72) Inventors: Wei Cui, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/989,539

(22) Filed: Aug. 10, 2020

(65) Prior Publication Data

US 2020/0371854 A1 Nov. 26, 2020

Related U.S. Application Data

(63) Continuation of application No. 16/402,960, filed on May 3, 2019, now Pat. No. 10,783,018.

(30) Foreign Application Priority Data

Jun. 15, 2018 (CN) .......................... 201810621141.3

(51) Int. Cl.
*G06F 9/54* (2006.01)
*G06N 3/08* (2006.01)

(52) U.S. Cl.
CPC ............... *G06F 9/547* (2013.01); *G06N 3/08* (2013.01)

(58) Field of Classification Search
None
See application file for complete search history.

(56) References Cited

U.S. PATENT DOCUMENTS

| 8,555,297 B1 | 10/2013 | Gould et al. |
| 9,578,362 B1 * | 2/2017 | Li .............................. G06N 3/08 |

(Continued)

FOREIGN PATENT DOCUMENTS

| CN | 101146127 A | 3/2008 |
| CN | 101217449 A | 7/2008 |
| CN | 101958928 A | 1/2011 |

OTHER PUBLICATIONS

Y. Meng et al., "Method Invocation Localizing Optimization in Parallelizing Object-Oriented Language," Chinese Journal of Computers, Apr. 2002, pp. 409-416, vol. 25, No. 4.

(Continued)

*Primary Examiner* — Craig C Dorais
(74) *Attorney, Agent, or Firm* — Ryan, Mason & Lewis, LLP

(57) ABSTRACT

Techniques for optimizing a remote call are provided. For example, a method includes obtaining a command for calling a remote dedicated processing resource and determining whether the command satisfies an optimization condition based on a type of the command. The method further comprises in response to determining that the command satisfies the optimization condition, ceasing to transmit the command to the remote dedicated processing resource. Accordingly, in the case that the remote dedicated processing resource needs to be called, the number of remote call commands transmitted to the remote dedicated processing resource can be reduced by optimizing the remote call commands, thereby improving the execution efficiency effectively.

20 Claims, 17 Drawing Sheets

(56) References Cited

U.S. PATENT DOCUMENTS

| | | |
|---|---|---|
| 2008/0005093 A1 | 1/2008 | Liu et al. |
| 2013/0077486 A1 | 3/2013 | Keith |
| 2016/0350674 A1 | 12/2016 | Midboe |
| 2018/0332654 A1* | 11/2018 | Ge .................. H04W 76/25 |
| 2018/0336078 A1 | 11/2018 | Bestfleisch |
| 2020/0074282 A1* | 3/2020 | Beaudoin ............ G06N 20/00 |
| 2021/0056400 A1* | 2/2021 | Lie ..................... G06N 3/063 |

OTHER PUBLICATIONS

L. Shi et al., "vCUDA: GPU-Accelerated High-Performance Computing in Virtual Machines," IEEE Transaction on Computers, Jun. 2012, pp. 804-816, vol. 61, No. 6.

* cited by examiner

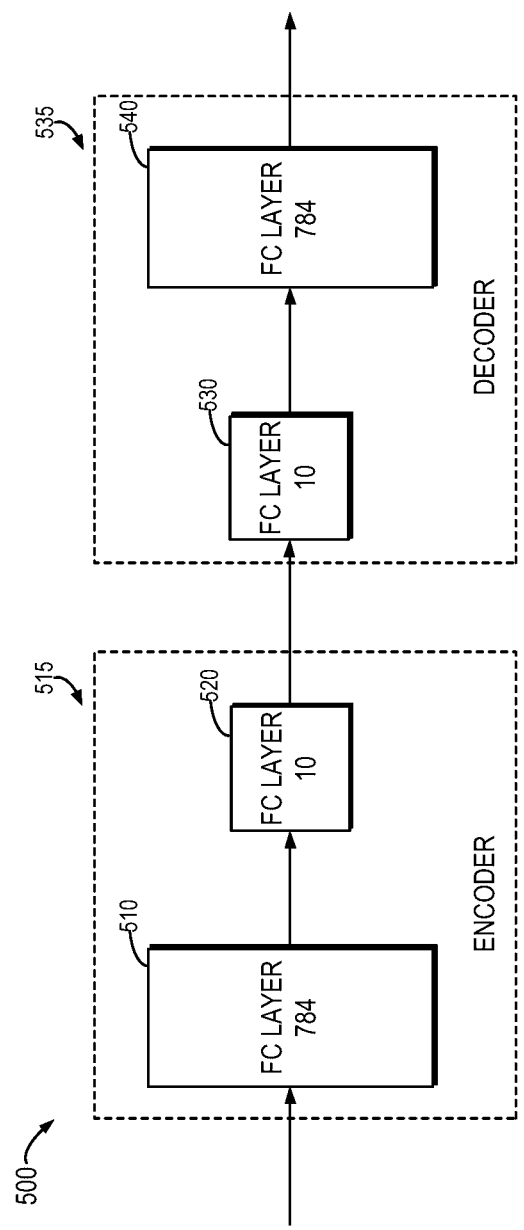

METHOD, DEVICE AND COMPUTER PROGRAM PRODUCT FOR OPTIMIZING REMOTE CALL

RELATED APPLICATION(S)

The present application is a continuation application of U.S. Ser. No. 16/402,960, filed May 3, 2019, which claims priority to Chinese Patent Application No. 201810621141.3, filed Jun. 15, 2018 and entitled "Method, Device and Computer Program Product for Optimizing Remote Call," which are incorporated by reference herein in their entirety.

FIELD

Embodiments of the present disclosure generally relate to the computer field, and more specifically, to a method, a device and a computer program product for optimizing a remote call.

BACKGROUND

Dedicated processing resources refer to some processing resources with special purposes, e.g., a Graphical Processing Unit (GPU). A GPU is a core processor dedicated for graphics or images processing, and its primary task is accelerating graphic processing speed. Due to its high-performance advantage (such as multicore and suitable for matrix operation), a GPU is widely used in many accelerators of applications, such as a machine learning application and a deep learning application.

Generally, the price of a GPU is expensive, and if the user only uses the local GPU resources, the price will be high. Accordingly, remote GPU resources may be provided to lower the cost for using the GPU, thereby implementing GPU-as-a-Service (GPUaas). The call of the remote GPU function by the local user application will be intercepted by the client and transmitted to the server side. The server will call the GPU function on the GPU hardware and return the result to the client. The costs can be lowered and the resource utilization rate can be improved by employing the remote GPU resources.

SUMMARY

Embodiments of the present disclosure provide a method, a device and a computer program product for optimizing remote call.

In one aspect of the present disclosure, there is provided a method for optimizing a remote call. The method comprises obtaining a command for calling a remote dedicated processing resource, and determining whether the command satisfies an optimization condition based on a type of the command. The method further comprises ceasing to transmit the command to the remote dedicated processing resource in response to determining that the command satisfies the optimization condition.

In another aspect of the present disclosure, there is provided a device for optimizing remote call. The device comprises a processing unit and a memory coupled to the processing unit and storing instructions. The instructions, when executed by the processing unit, perform actions of obtaining a command for calling a remote dedicated processing resource and determining whether the command satisfies an optimization condition based on a type of the command. The actions further comprise in response to determining that the command satisfies the optimization condition, ceasing to transmit the command to the remote dedicated processing resource.

According to a further aspect of the present disclosure, there is provided a computer program product. The computer program product is tangibly stored on a non-transient computer readable medium and comprises machine-executable instructions. The machine-executable instructions, when executed, cause a computer to perform a method or process according to embodiments of the present disclosure.

The Summary is provided to introduce a selection of concepts in a simplified form that are further described below in the Detailed Description. This Summary is not intended to identify key features or essential features of the present disclosure, nor is it intended to be used to limit the scope of various embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same element in the example embodiments of the present disclosure.

FIGS. 5A-5J illustrate schematic diagrams of example implementations for optimizing the remote call according to embodiments of the present disclosure.

DETAILED DESCRIPTION

Preferred embodiments of the present disclosure will be described in more detail with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second" and so on can refer to same or different objects unless the context clearly indicates otherwise.

Figure 1:
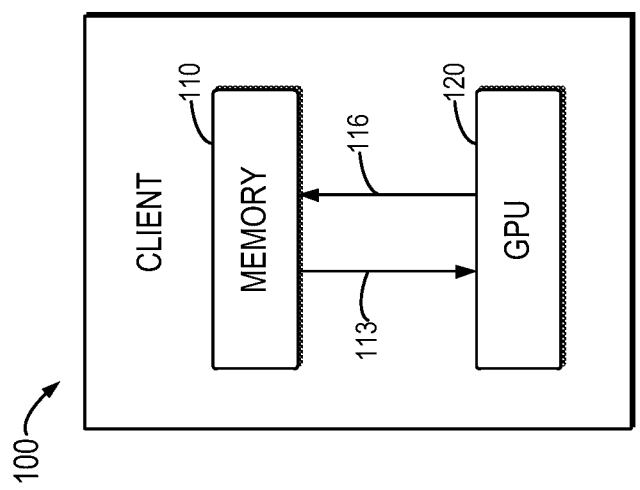
FIG. 1 illustrates a schematic diagram of a traditional environment for calling a local dedicated processing resource.

A dedicated computing resource (e.g., GPU), due to its high-performance advantage (such as multicore and suitable for matrix operation), is widely applied as an accelerator of many applications, such as a machine learning application and a Deep Neural Network (DNN) learning application. A traditional method can locally configure the GPU hardware resources and FIG. 1 illustrates a schematic diagram of a traditional environment where a local dedicated processing resource is called. As shown in FIG. 1, the client 100 is internally provided with a memory 110 and a GPU 120. When computation needs to be performed using the GPU, the data can be transmitted from the memory 110 to the GPU 120 as indicated by arrow 113. Next, a kernel function is operating on the GPU 120 to achieve the required computation. After the computation is completed, the computation result may be transmitted back to the memory 110 from the GPU 120 as indicated by arrow 116.

The price of a GPU is usually expensive, and if the user only uses the local GPU resources, the price will be high. Therefore, one improved method is providing remote GPU resource(s) to lower the cost for using a GPU. However, the use of remote GPU resources requires utilizing a remote call command, such as Remote Procedure Call (RPC) whereas excessive RPCs will result in huge network and computation expenses. Hence, the improved method needs to transmit many RPCs, causing low execution efficiency.

For this purpose, embodiments of the present disclosure provide a new solution for optimizing the remote call. According to embodiments of the present disclosure, when it is required to call the remote dedicated processing resource(s), the number of remote call commands transmitted to the remote dedicated processing resource can be reduced by optimizing the remote call command(s). In addition, embodiments of the present disclosure optimize the configuration of the neural network layer using the idea of Copy-On-Write (COW), thereby effectively enhancing the execution efficiency. The COW idea mainly lies in that: if a new configuration exists in the history, the old configuration can be reused; if it is required to reuse the old configuration, the old configuration should be copied before being covered or removed. In a neural network model consisting of a limited number of configurations, embodiments of the present disclosure can drastically reduce the number of remote call commands.

Basic principles and several example implementations of the present disclosure will be explained below with reference to FIGS. 2 to 6. It should be understood that the example embodiments are provided merely for those skilled in the art to better understand and further implement embodiments of the present disclosure, rather than restricting the scope of the present disclosure in any manner.

Figure 2:
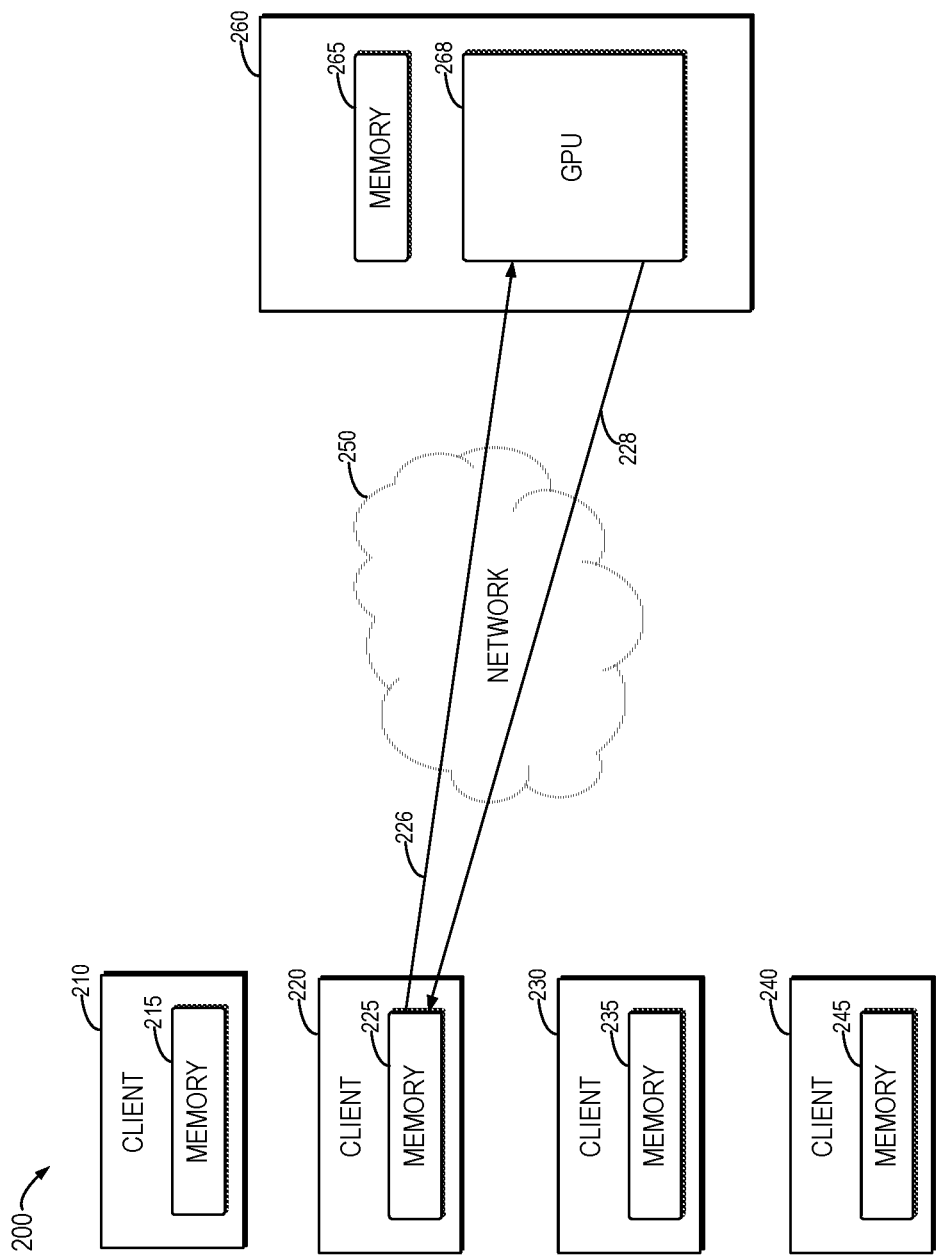
FIG. 2 illustrates a schematic diagram of an example environment for calling a remote dedicated processing resource according to embodiments of the present disclosure.

FIG. 2 illustrates a schematic diagram of an example environment 200 for calling a remote dedicated processing resource according to embodiments of the present disclosure. As shown in FIG. 2, the environment 200 includes clients 210, 220, 230 and 240 and a server 260. These devices are interconnected with each other via a network 250, which may be a wired network and/or a wireless network. Each client includes a local memory, for example, the client 210 includes a memory 215, the client 220 includes a memory 225, the client 230 includes a memory 235 and the client 240 includes a memory 245. These clients may not include the local dedicated computing resource, such as a GPU. Alternatively, these clients may also include the local GPU. In other words, these clients alternatively can call both the local GPU and the remote GPU. The server 260 includes a memory 265 and a GPU 268, and the GPU 268 in the server 260 can provide remote processing capability for the clients 210, 220, 230 and 240. It should be appreciated that the client and the server in FIG. 1 also can include other components or modules not shown.

The client-server architecture (such as a GPUaas engine) related to the environment 200 commonly can be divided into two parts: client-side library and server-side daemon. If the client-side application needs to call the remote GPU resource, a channel is established between the client and the server, the channel is used for transferring a GPU command list, and each command represents a GPU function.

Now continuing to refer to FIG. 2, as indicated by arrow 226, if the client 220 needs to use the remote GPU resource, it may transmit data to the server 260. Then, the GPU 268 in the server 260 executes the dedicated computation and returns the computation result to the client 220, as indicated by arrow 228. It should be understood that although embodiments of the present disclosure utilize the GPU as one example of the dedicated computing resource, the dedicated computing resource also can be other dedicated computing resources. According to embodiments of the present disclosure, the number of remote call commands transmitted to the server 260 from the client 220 can be reduced by optimizing the remote call commands (e.g., RPC) which are required to be transmitted from the client 220 to the server 260, thereby effectively improving the execution efficiency.

Figure 3:
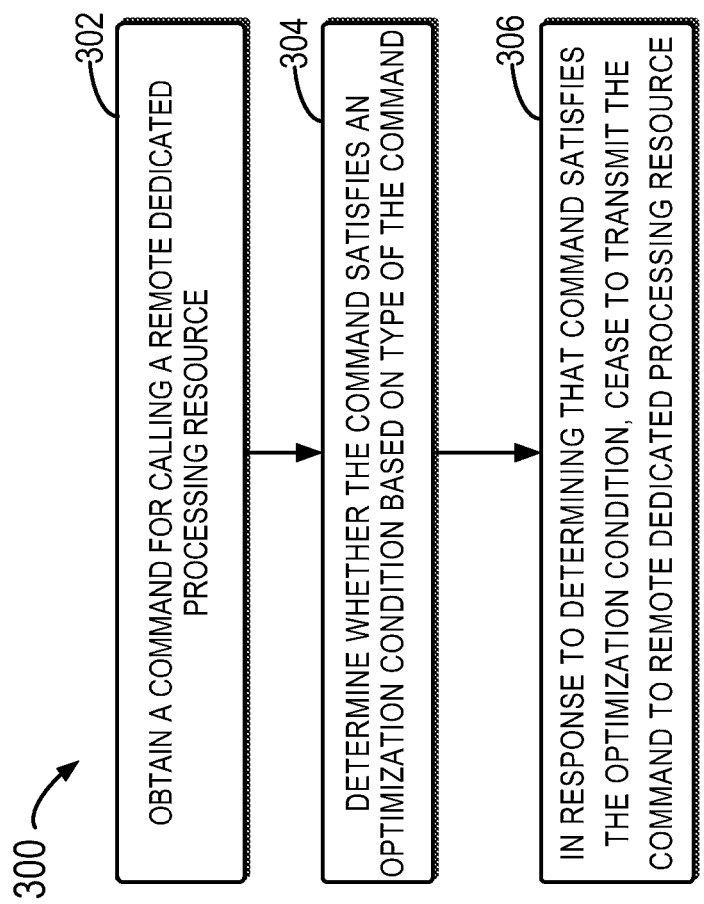
FIG. 3 illustrates a flowchart of a method for optimizing a remote call according to embodiments of the present disclosure.

FIG. 3 illustrates a flowchart of a method 300 for optimizing the remote call according to embodiments of the present disclosure. It should be understood that the method 300 can be executed by the client 210, 220, 230 or 240 as described above with reference to FIG. 2.

At 302, a command for calling a remote dedicated processing resource is obtained. For example, the client 220 intercepts a command which is required to call the GPU 268 in the server 260. That is, before the client 220 transmits the remote call command to the server 260, the command may be analyzed and optimized. In some embodiments, the remote call command can be a first type of command for creating an object (e.g., cudnnCreate*Descriptor), a second type of command for setting a configuration (e.g., cudnnSet*Descriptor), a third type of command for performing forward or backward computation (e.g., cudnnPerformLayer*) and a fourth type of command for destroying an object (e.g., cudnnDestory*Descriptor). It should be understood that although embodiments of the present disclosure use the above four commands as example descriptions, embodiments of the present disclosure are not restricted to the four commands. That is, the embodiments of the present disclosure can include more or less types of remote call commands.

In some embodiments, the remote call command is a Remote Procedure Call (RPC) and is obtained from a Deep Neural Network (DNN) library. In other words, the remote call command can be some commands in an Application Program Interface (API) from the DNN library. However, it should be understood that the remote call command also can be other commands that comply with certain protocols between the client 220 and the server 260.

At 304, it is determined whether the command satisfies an optimization condition based on a type of the command. For example, the client 220 can respectively analyze whether different types of commands satisfy the optimization condition. In some embodiments, the third type of command for executing forward or backward computation need not to be optimized because it is the core command for performing the dedicated computation; therefore, it is determined that the third type of command does not satisfy the optimization condition. In some embodiments, the fourth type of command for destroying an object is totally optimized because embodiments of the present disclosure do not need to release the configuration resources; therefore, it is determined that the fourth type of command satisfies the optimization condition. Example implementations for optimizing different types of commands are described below with reference to FIGS. 4A-4C.

At 306, in response to determining that the command satisfies the optimization condition, the transmission of the command to the remote dedicated processing resource is ceased. For example, if the client 220 determines that a certain command satisfies the optimization condition, the client may not transmit the command to the server 260. On the contrary, if the client 220 determines that a certain command does not satisfy the optimization condition, the client needs to transmit the command to the server 260, so as to enable the GPU 268 in the server 260 to perform the computation. By optimizing the remote commands, embodiments of the present disclosure spare the efforts of transmitting some remote call commands to the remote dedicated computing resources, thereby reducing the number of the remote call commands and improving the execution efficiency of the overall computing system.

For example, some sets can be configured to determine whether various types of commands satisfy the optimization condition. In some embodiments, an unallocated set (e.g., NOT_ALLOCATED), an unconfigured set (e.g., ALLOCATED_PRE_CONFIG) and a configured set (e.g., ALLOCATED_POST_CONFIG) may be set up, wherein the unallocated set includes objects which are brand new and not created, the unconfigured set includes objects which have been created but not configured yet, and the configured set includes objects which have been created and configured as well as the associated configuration information. Example implementations of unallocated set, unconfigured set and configured set are illustrated below with reference to FIGS. 5A-5J, and example implementations of how to optimize various types of commands based on the sets are described with reference to FIGS. 4A-4C.

Figure 4A:
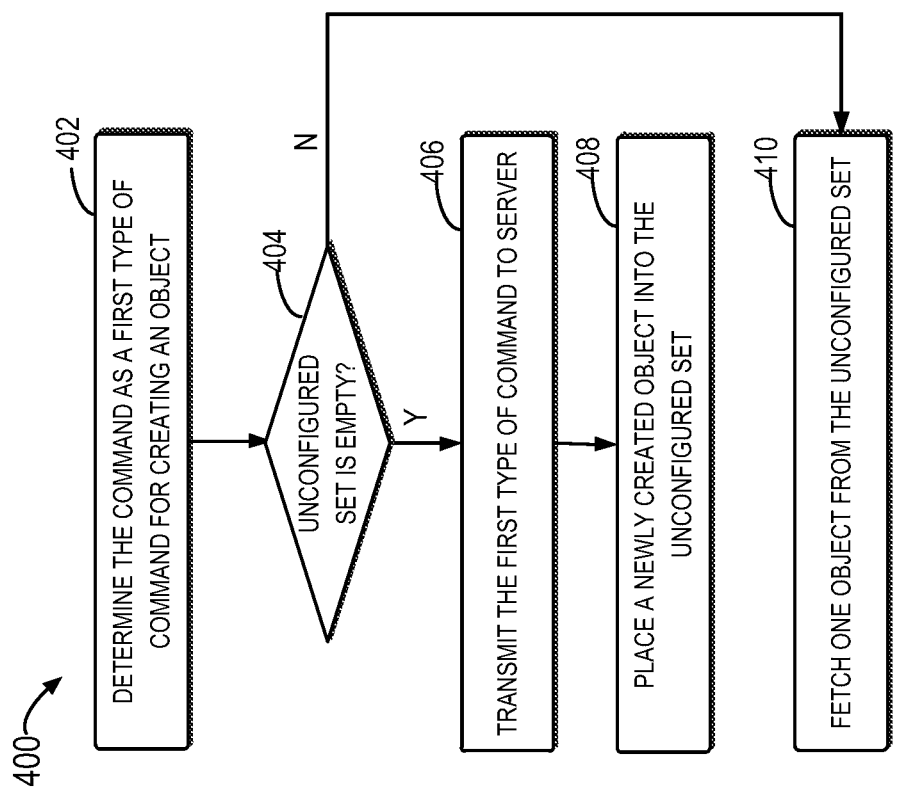
FIG. 4A illustrates a flowchart of a method for optimizing a first type of command according to embodiments of the present disclosure.

FIG. 4A illustrates a flowchart of a method 400 for optimizing a first type of command according to embodiments of the present disclosure. It should be understood that the method 400 may be executed by the client 210, 220, 230 or 240 as described with reference to FIG. 2, and the method 400 may be an example implementation of actions 304 and 306 in the method 300 as described with reference to FIG. 3.

At 402, it is determined that the remote call command is a first type of command for creating an object. At 404, it is judged whether the unconfigured set is empty or not. If the unconfigured set is empty, it means there are no created objects that can be reused (i.e., not satisfying the optimization condition). At 406, a first type of command needs to be transmitted to the server, so as to create a new object, and the newly created object is placed in the unconfigured set at 408. If the unconfigured set is not empty, it means that the created objects in the unconfigured set may be reused (i.e., satisfying the optimization condition), and one object is fetched or popped from the unconfigured set for reuse at 410.

Figure 4B:
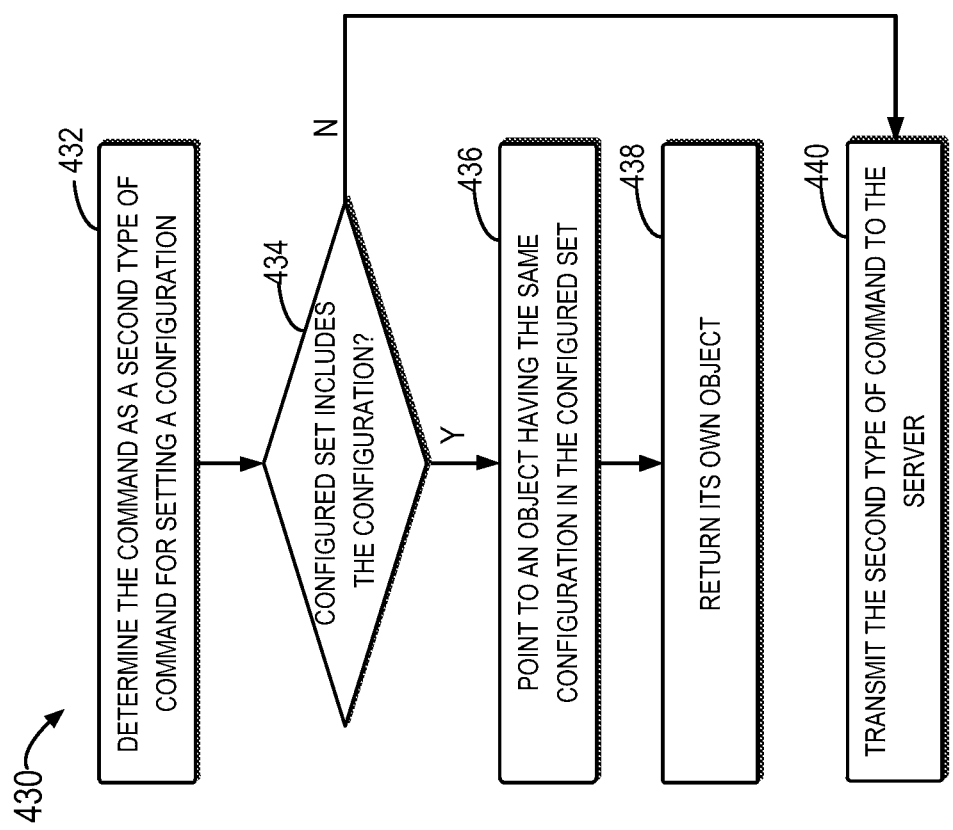
FIG. 4B illustrates a flowchart of a method for optimizing a second type of command according to embodiments of the present disclosure.

FIG. 4B illustrates a flowchart of a method 430 for optimizing a second type of command according to embodiments of the present disclosure. It should be understood that the method 430 may be executed by the client 210, 220, 230 or 240 as described with reference to FIG. 2, and the method 430 can be an example implementation of actions 304 and 306 in the method 300 as described above with reference to FIG. 3.

At 432, it is determined that the remote call command is a second type of command for setting a configuration. At 434, it is determined whether the configured set contains configurations to be set up. If the configured set includes the configurations to be set up, it means that there are already set configurations that may be reused (i.e., satisfying the optimization condition), and the object is pointed to the object having the same configuration in the configured set at 436, and the object itself is returned at 438. If the configured set does not contain the configurations to be set up, it means that there is no configuration that may be reused (i.e., not satisfying the optimization condition), and a second type of command is transmitted to the server to set a new configuration at the server at 440. In addition, when it is required to modify the old configurations, the old configurations can be kept prior to executing the modification.

Figure 4C:
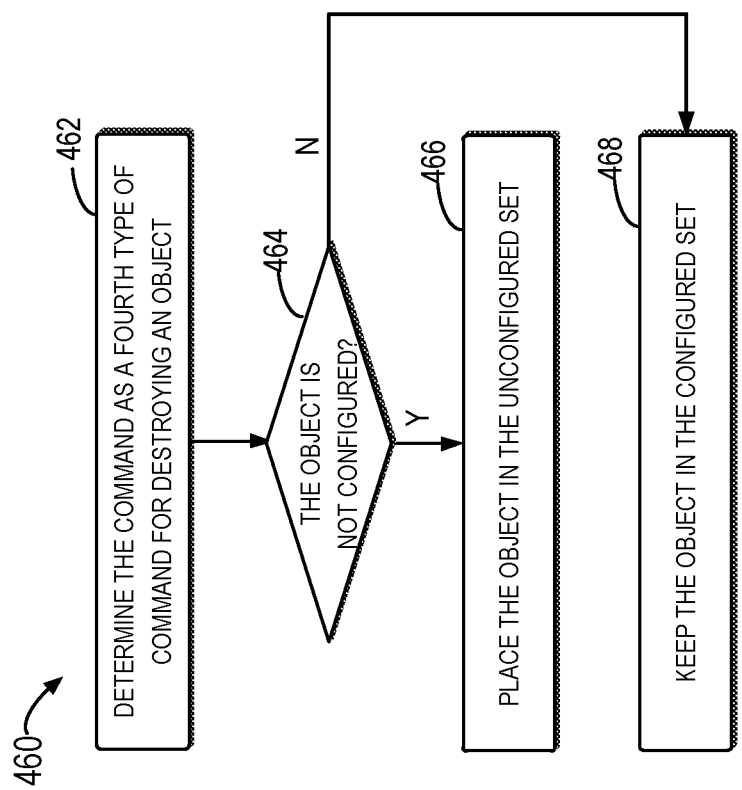
FIG. 4C illustrates a flowchart of a method for optimizing a fourth type of command according to embodiments of the present disclosure.

FIG. 4C illustrates a flowchart of a method 460 for optimizing a fourth type of command according to embodiments of the present disclosure. It should be understood that the method 460 may be executed by the client 210, 220, 230 or 240 as described with reference to FIG. 2, and the method 460 may be an example implementation of actions 304 and 306 in the method 300 as described with reference to FIG. 3.

At 462, it is determined that the command is a fourth type of command for destroying an object. The fourth type of command relates to destroying objects and does not need to be transmitted to the server, so all of them satisfy the optimization condition. At 464, it is determined whether the object has been configured. If the object is not configured yet, it is placed in the unconfigured set at 466. If the object is already configured, the object is kept in the configured set at 468 without performing any action.

In some embodiments, a cache optimization may be executed in a case that the contents in the configured set are too many. For example, if the length of the configured set exceeds a predetermined threshold, the configuration, which is not utilized by any object, may be removed. In some embodiments, a counter may be employed to manage whether a configuration is shared, so as to maintain how many neural network descriptors should share a certain configuration. If the configuration is shared by one or more neural network descriptors, the counter can store the number of sharing; however, if the counter is zero, it indicates that the configuration is not shared by any current neural network descriptor, so the configuration, when exceeding an upper limit, may be removed so as to release the cache resources.

Figure 5B:
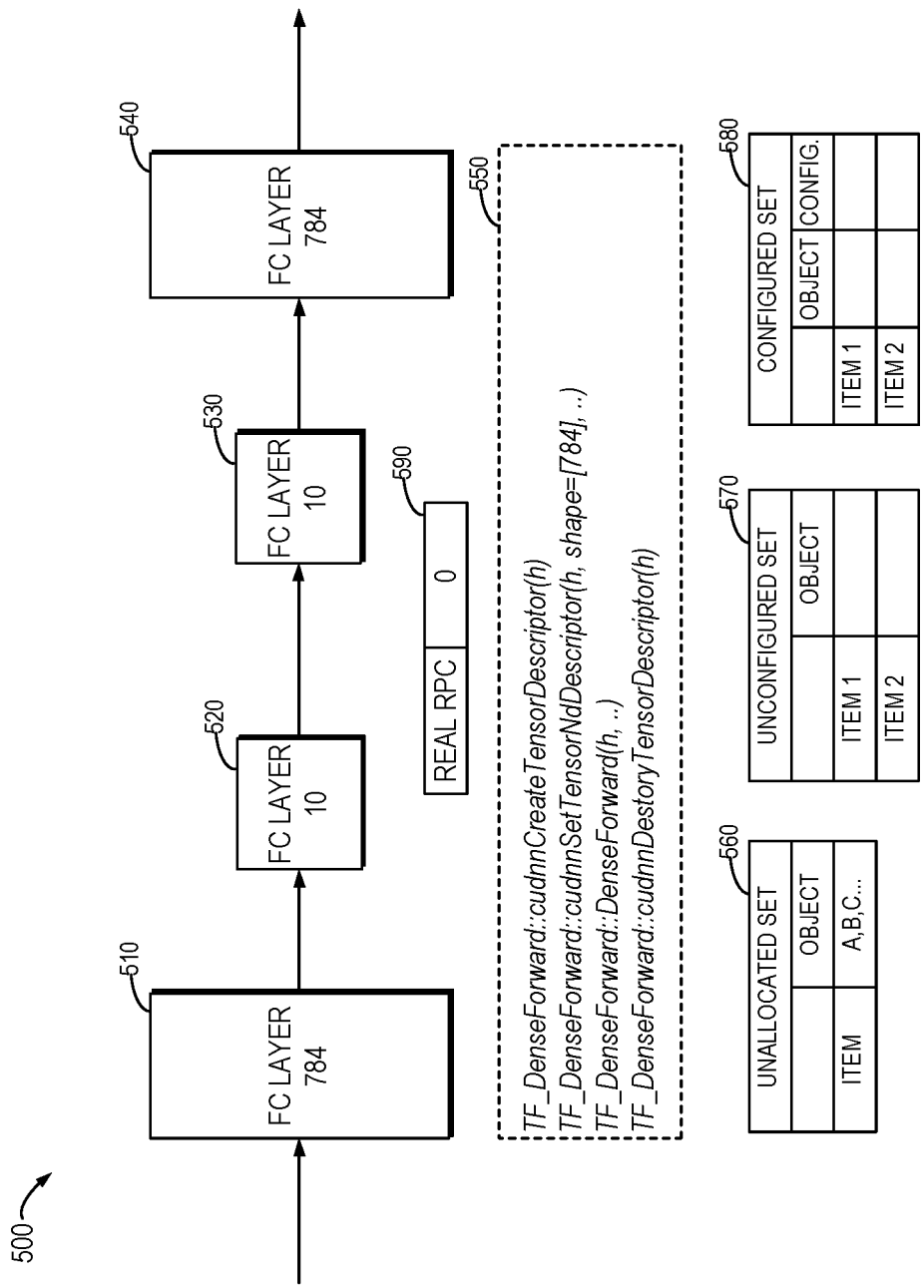

FIGS. 5A-5J illustrate schematic diagrams of example implementations for optimizing the remote call according to embodiments of the present disclosure. FIG. 5A illustrates an example environment 500 for the neural network, which includes Fully Connected (FC) layers 510, 520, 530 and 540, wherein the FC layers 510 and 520 relate to an encoder part 515 while the FC layers 530 and 540 relate to a decoder part 535. In an example of the environment 500, the FC layers 510 and 540 involve the same configuration, which for example is composed of 784 vectors, while the FC layers 520 and 530 involve the same configuration, which for example is composed of 10 vectors.

FIG. 5B illustrates a set configuration at an initial phase, where the unallocated set 560 includes initially unallocated objects, and the unconfigured set 570 and the configured set 580 are initially empty. The RPC set 550 represents a set of commands in need of execution, and the table 590 is provided for recording the number of real RPC which should be transmitted after the optimization according to embodiments of the present disclosure and the initial state of the table is 0. It should be understood that although FIG. 5B uses CUDNN as an example library for training the accelerated deep learning application, other neural network libraries are also possible. The API of CUDNN typically can be denoted by the neural network layer execution managed by the neural network descriptor sequence. The neural network descriptor is an object for setting forward/backward configurations of the neural network layer etc. Each descriptor can manage different types of neural network resources and can share similar programming interface. The overheads for local execution of the neural network descriptor are usually small. However, the presence of additional RPC communications and computing overheads in the GPUaas environment will significantly affect the execution performance.

Figure 5C:
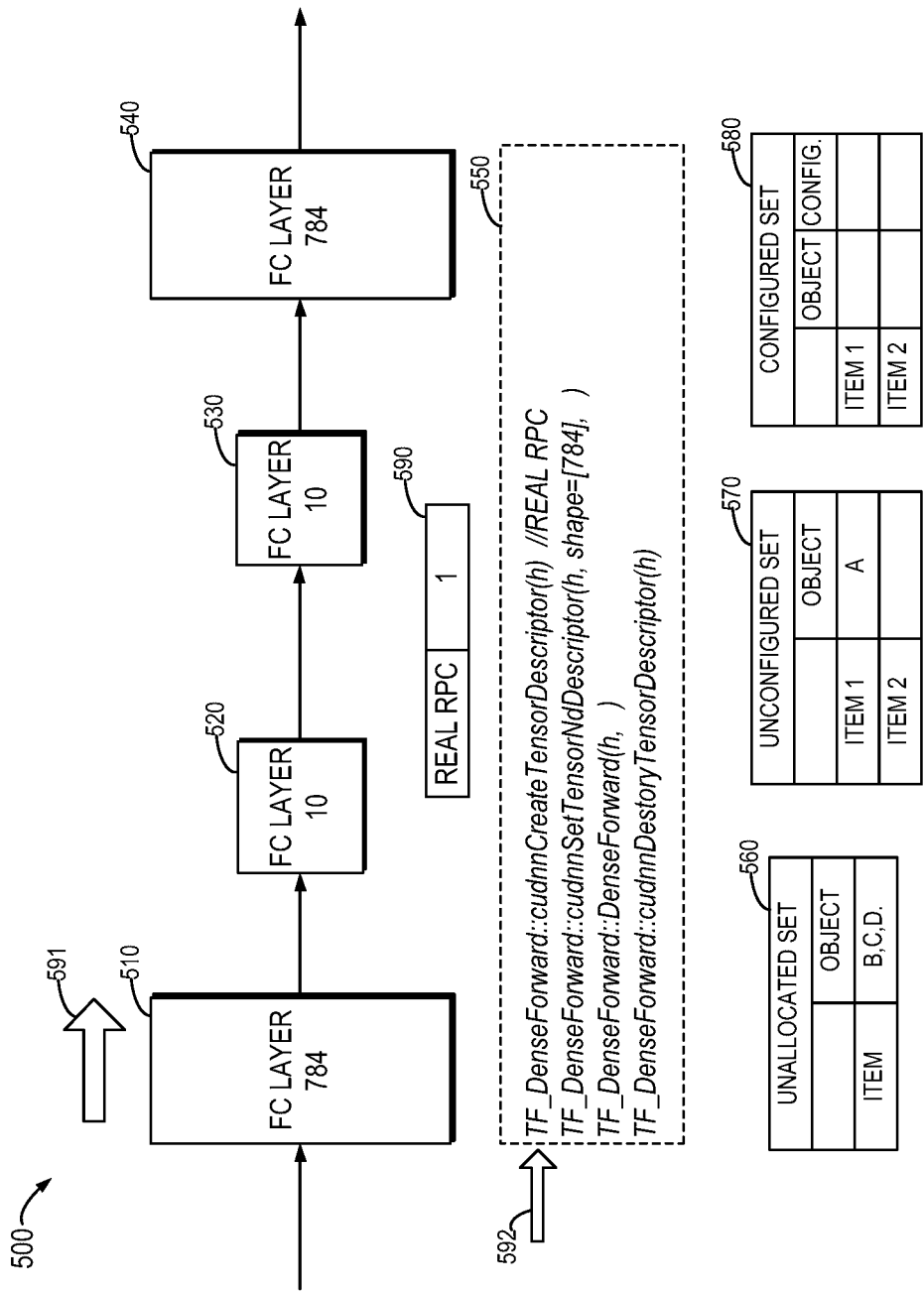

FIG. 5C illustrates an example of executing a first type of command in the RPC set 550 at the FC layer 510. As shown by arrow 591, the forward computation is performed at the FC layer 510 and the command under execution is a first type of command for creating an object as indicated by arrow 592. Because the unconfigured set 570 is empty, it is required to execute the real RPC, and one object such as object A, is created in the unconfigured set 570.

Figure 5D:
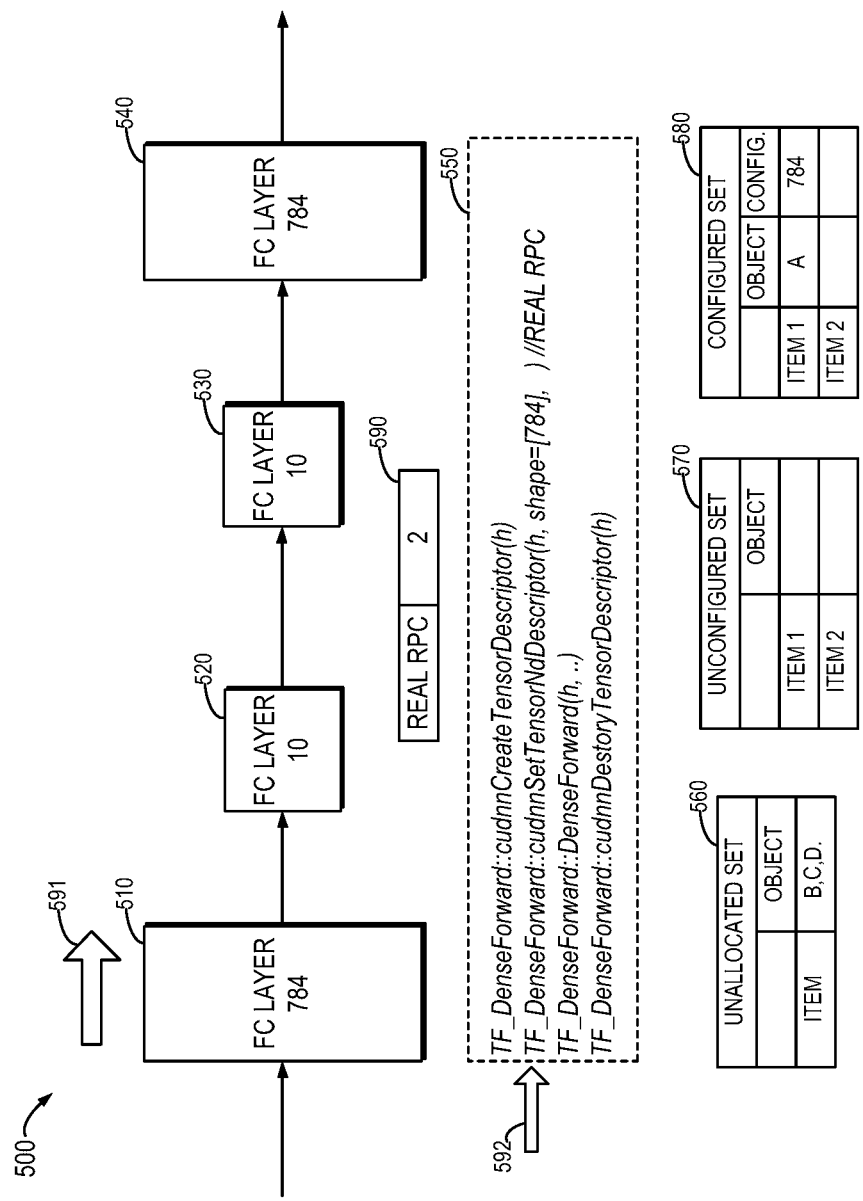

FIG. 5D illustrates an example of executing a second type of command in the RPC set 550 at the FC layer 510. Because the configured set 580 is empty, there are no configurations identical to the configurations to be set (e.g., configuration 784) by the second type of command. Therefore, it is required to execute the real RPC, and the object A and its corresponding configuration 784 are set in the configured set 580 while the object A is removed from the unconfigured set 570.

Figure 5E:
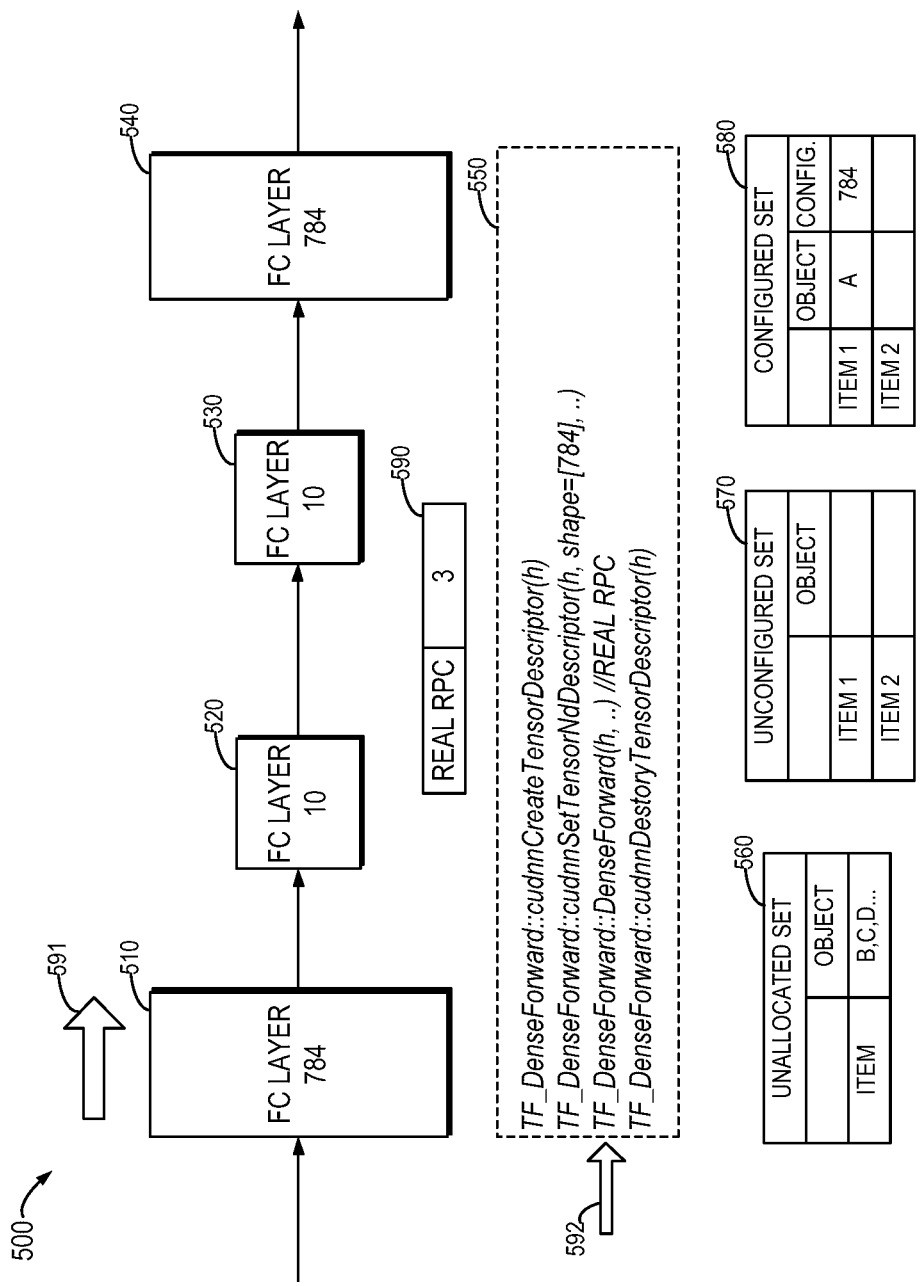

FIG. 5E illustrates an example of executing a third type of command in the RPC set 550 at the FC layer 510. The third type of command is not optimized because it is the core command for executing the forward computation. Therefore, it is determined that the third type of command does not satisfy the optimization condition. Hence, it is required to execute the real RPC and there is no change to the sets 560, 570 and 580.

Figure 5F:
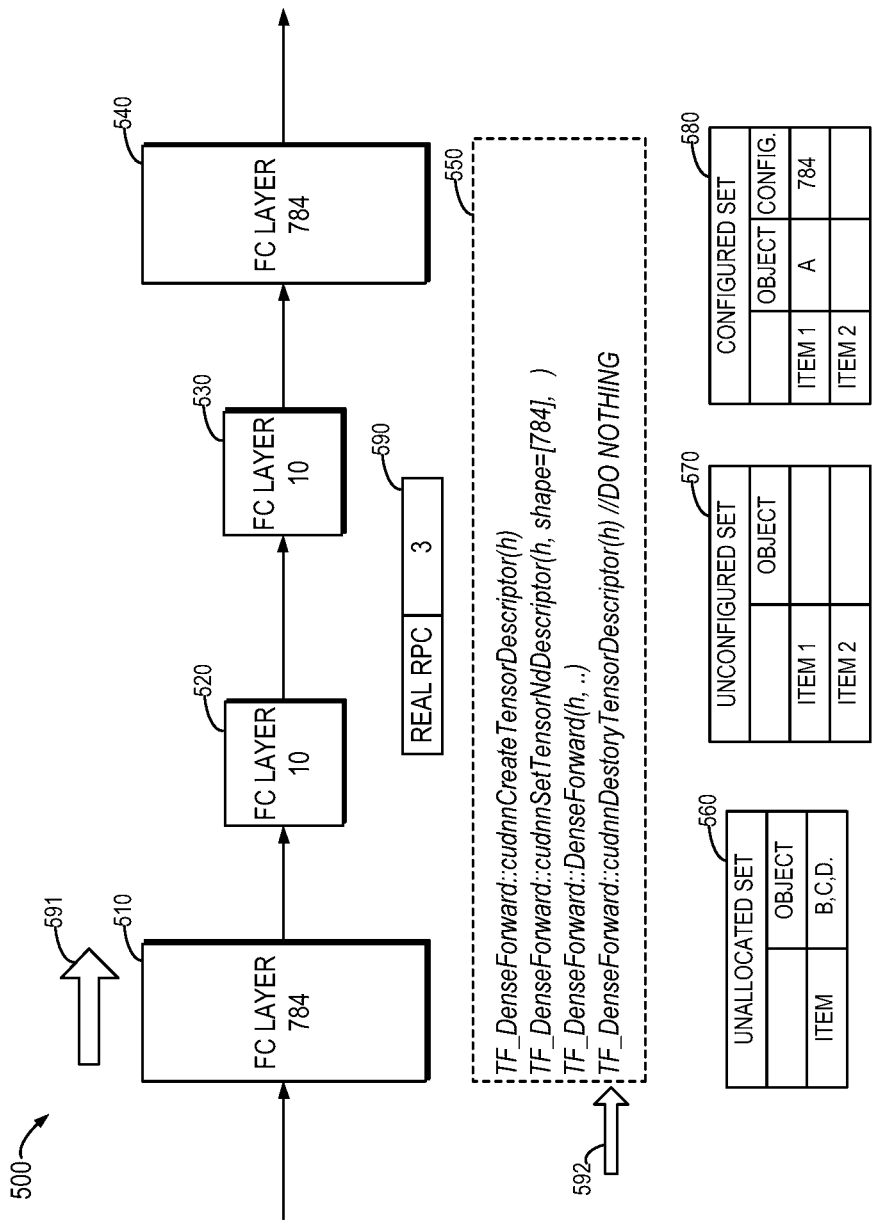

FIG. 5F illustrates an example of executing a fourth type of command in the RPC set 550 at the FC layer 510. The fourth type of command for destroying an object is fully optimized because embodiments of the present disclosure do not need to release the configuration resources, i.e., it is determined that the fourth type of command satisfies the optimization condition. Hence, it is unnecessary to execute the real RPC. The real RPC number in table 590 remains unchanged and there is no change to the sets 560, 570 and 580. For example, as shown by table 590, the number of currently executed real RPCs is 3, which is one less than the 4 RPCs in the traditional method.

Figure 5G:
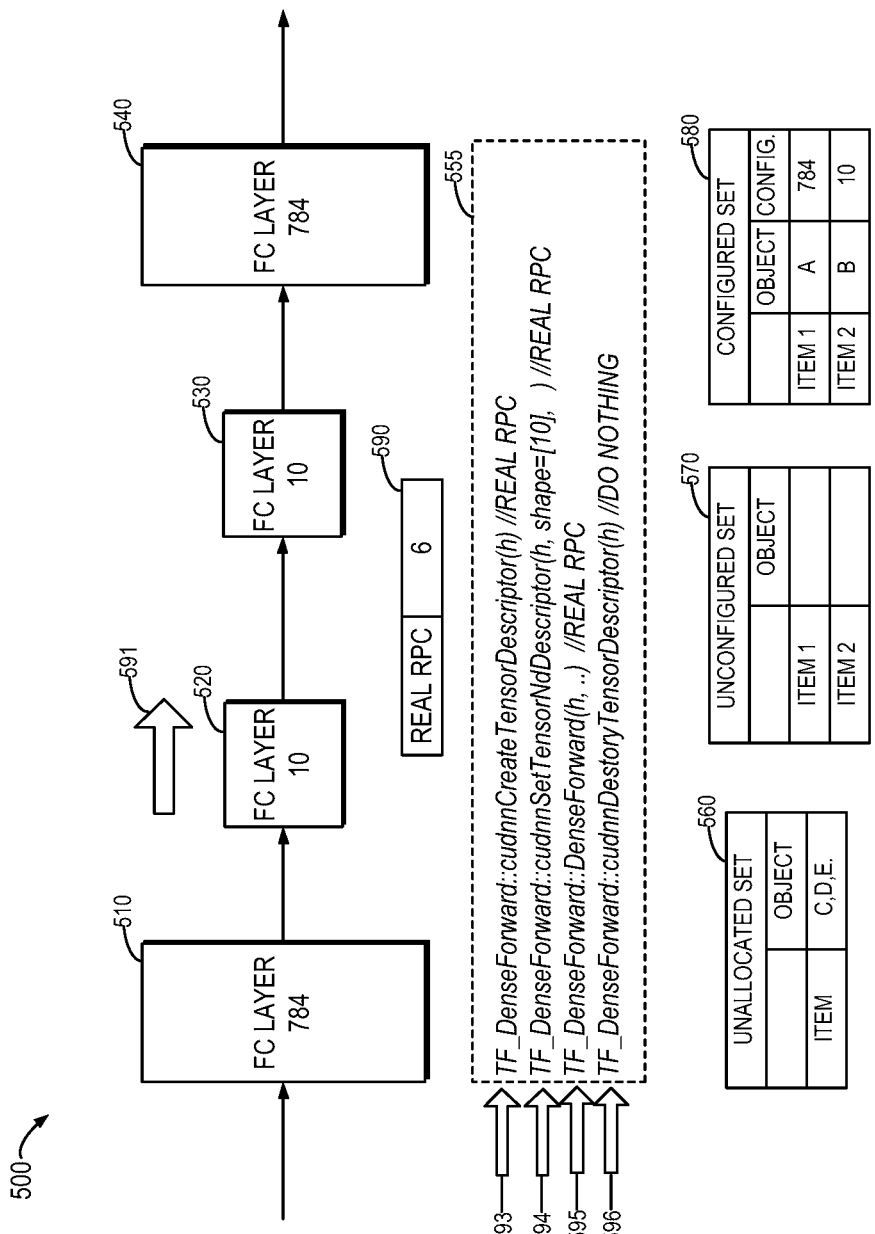

FIG. 5G illustrates an example of executing four types of commands in the RPC set 555 at the FC layer 520. As indicated by arrow 591, a forward computation is being performed at the FC layer 520 at this moment. As indicated by arrow 593, for the first type of command, it is required to execute the real RPC and create an object B in the unconfigured set because there is no object in the unconfigured set 570. According to arrow 594, for the second type of command, it is required to execute the real RPC and set up a new configuration 10 in the configured set 580 due to the absence of configuration 10 in the configured set 580, and the object B in the unconfigured set 570 is removed simultaneously. As indicated by arrows 595 and 596, the third type of command always needs to be really executed while the fourth type of command can be optimized all the time without being really executed. For example, as shown in table 590, the number of currently executed real RPCs is 6, which is two less than the 8 RPCs in the traditional method.

Figure 5H:
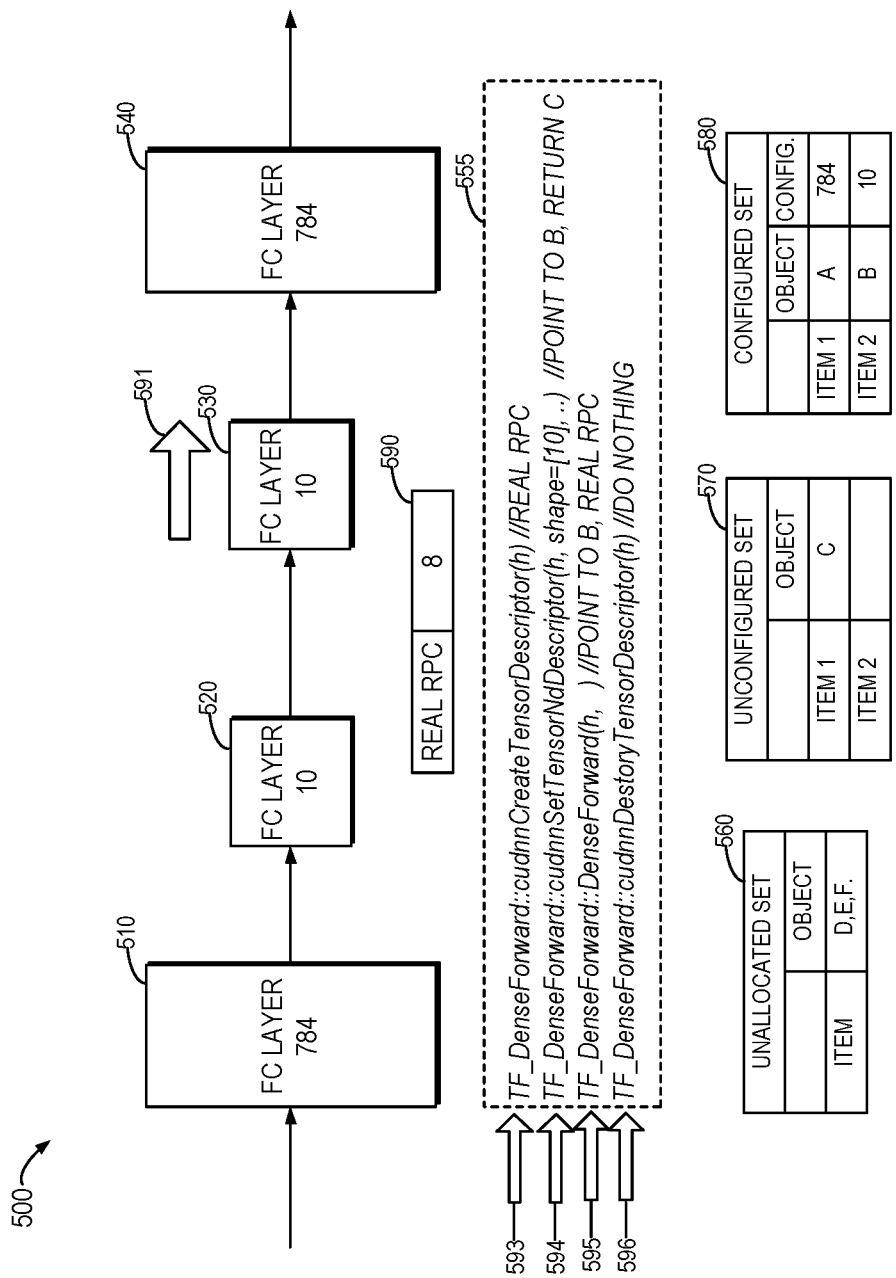

FIG. 5H illustrates an example of executing four types of commands in the RPC set 555 at the FC layer 530. As indicated by arrow 591, a forward computation is being performed at the FC layer 530 at this moment. As indicated by arrow 593, for the first type of command, it is required to execute the real RPC and create an object C in the unconfigured set because there is no object in the unconfigured set 570. According to arrow 594, for the second type of command, it is unnecessary to execute the real RPC because the configured set 580 already has the same configuration 10; instead, it is only required to point the object C to the object B and return the object C. As indicated by arrows 595 and 596, the third type of command always needs to be really executed while the fourth type of command can be optimized all the time without being really executed. For example, as shown in table 590, the number of currently executed real RPCs is 8, which is four less than the 12 RPCs in the traditional method.

Figure 5I:
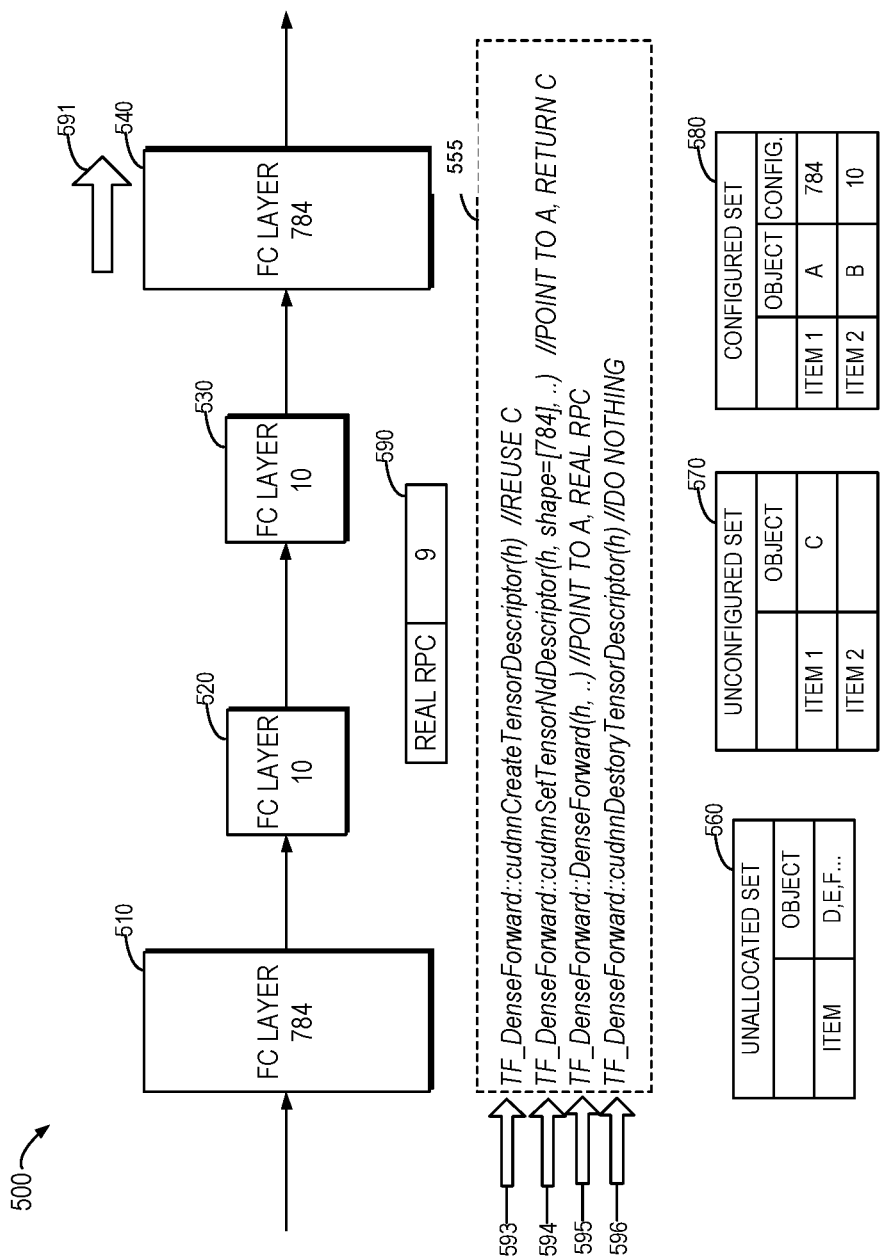

FIG. 5I illustrates an example of executing four types of commands in the RPC set 555 at the FC layer 540. As indicated by arrow 591, a forward computation is being performed at the FC layer 540 at this moment. As indicated by arrow 593, for the first type of command, it is required to reuse the object C only without executing the real RPC because the object C exists in the unconfigured set 570. According to arrow 594, for the second type of command, it is unnecessary to execute the real RPC because the configured set 580 already has the same configuration 784; instead, it is only required to point the object C to the object A and return the object C. As indicated by arrows 595 and 596, the third type of command always needs to be really executed while the fourth type of command can be optimized all the time without being really executed. For example, as shown in table 590, the number of currently executed real RPCs is 9, which is seven less than the 16 RPCs in the traditional method.

Figure 5J:
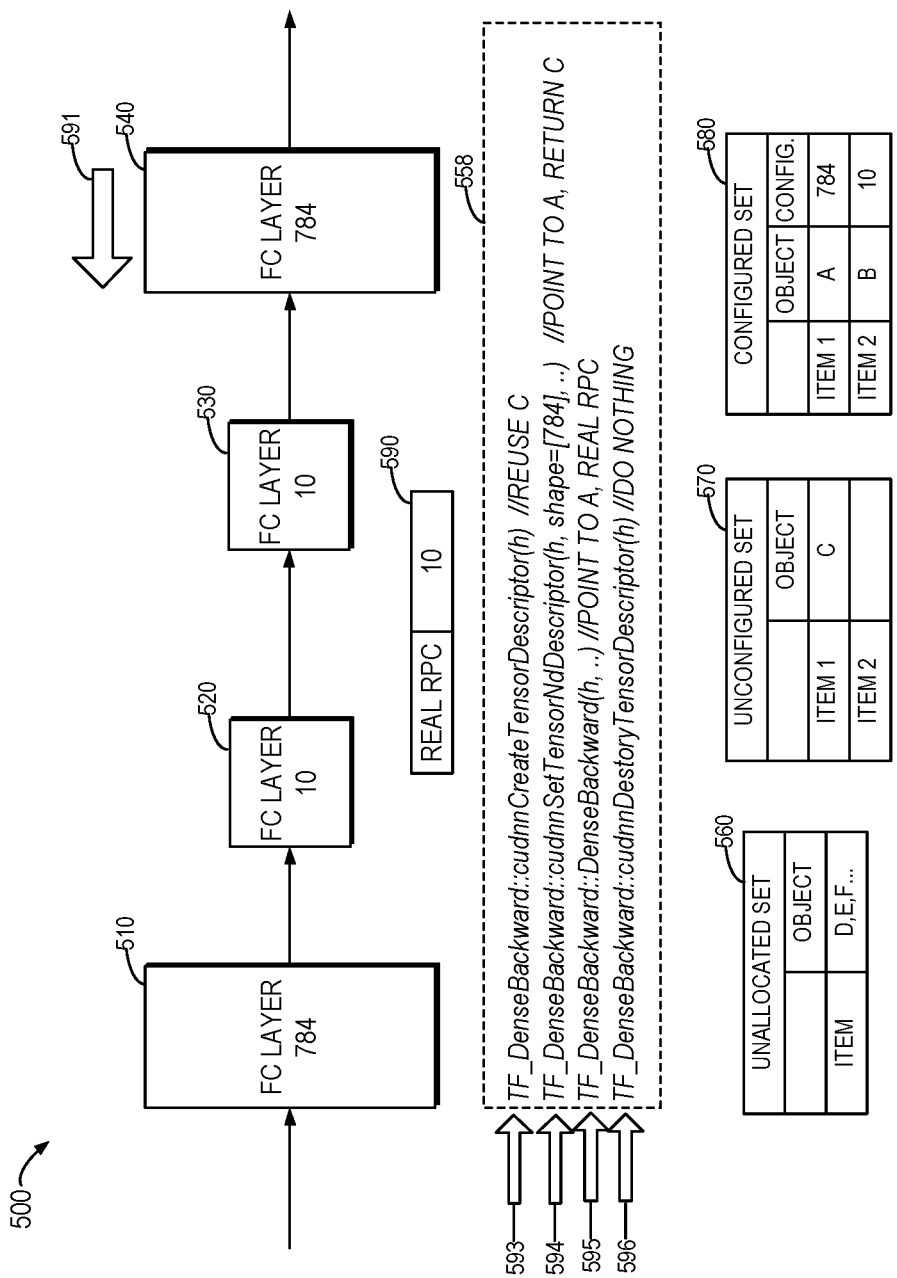

FIG. 5J illustrates an example of executing four types of commands in the RPC set 558 at the FC layer 540. As indicated by arrow 591, a backward computation is being performed at the FC layer 540 at this moment. As indicated by arrow 593, for the first type of command, it is required to reuse the object C only without executing the real RPC because the object C exists in the unconfigured set 570. According to arrow 594, for the second type of command, it is unnecessary to execute the real RPC because the configured set 580 already has the same configuration 784; instead, it is only required to point the object C to the object A and return the object C. As indicated by arrows 595 and 596, the third type of command always needs to be really executed while the fourth type of command can be optimized all the time without being really executed. For example, as shown in table 590, the number of currently executed real RPCs is 10, which is ten less than the 20 RPCs in the traditional method.

Next, when the backward computation is executed respectively at the FC layers 530, 520 and 510, only one of the four types of commands needs to be executed, i.e., the third type of command for executing the computation, due to the presence of the object C and the configuration 784 or 10, which may be reused. Hence, in the subsequent other rounds of iterative computation procedures, three quarters of the commands, which have been optimized, do not need to be transmitted to the server to be executed by the GPU. Therefore, embodiments of the present disclosure can reduce a large amount of remote call commands after multiple rounds of iterations (hundreds of, thousands of or even more times). In the examples of 5A-5J, about for example 75% of the remote call commands can be reduced, thereby effectively improving the execution efficiency.

Figure 6:
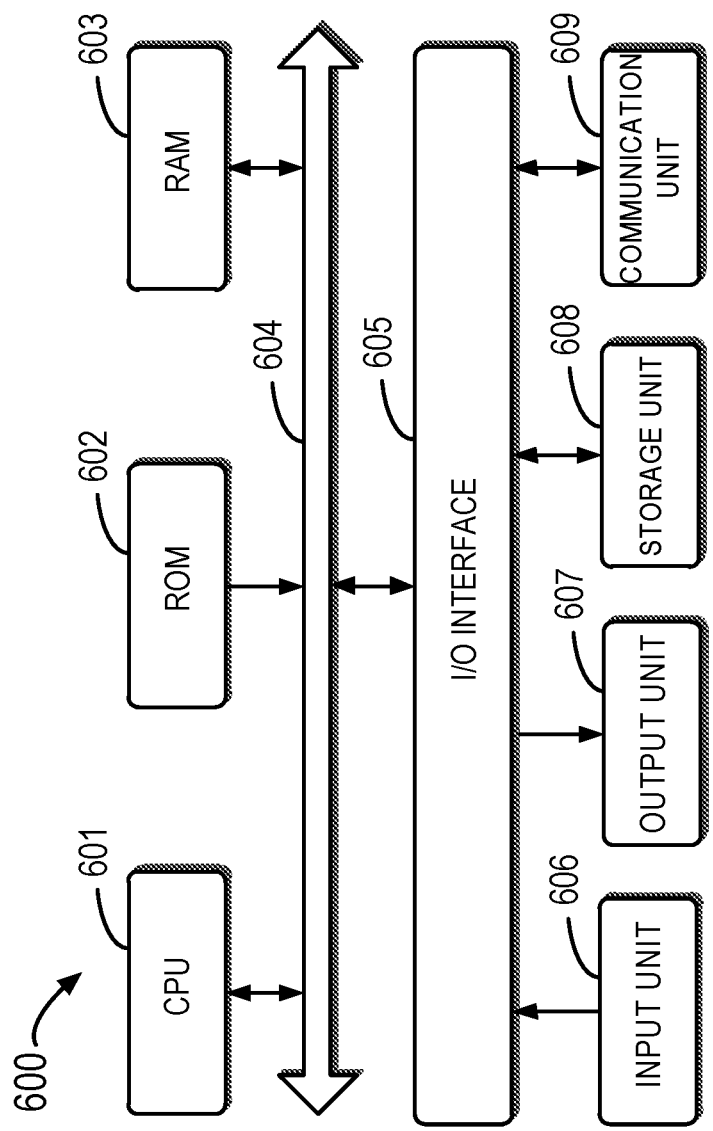
FIG. 6 illustrates a schematic block diagram of a device which may be used to implement embodiments of the present disclosure.

FIG. 6 illustrates a schematic block diagram of an example device 600 for implementing embodiments of the present disclosure. The device can be client 210, 220, 230 or 240 as described above with reference to FIG. 2. As shown, the device 600 includes a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 may also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 are connected to the I/O interface 605, including: an input unit 606, such as keyboard, mouse and the like; an output unit 607, such as various kinds of display and loudspeakers and the like; a storage unit 608, such as disk and optical disk and the like; and a communication unit 609, such as network card, modem, wireless transceiver and the like. The communication unit 609 allows the device 600 to exchange information/data with other devices via the computer network, such as Internet, and/or various telecommunication networks.

The above described each method or procedure can also be executed by the processing unit 601. For example, in some embodiments, the method can be implemented as a computer software program tangibly included in the machine-readable medium, e.g., storage unit 608. In some embodiments, the computer program can be partially or fully loaded and/or mounted to the device 600 via ROM 602 and/or communication unit 609. When the computer program is loaded to RAM 603 and executed by the CPU 601, one or more steps or actions of the above described method or procedure can be implemented.

In some embodiments, the above described method and procedure may be implemented as computer program product. The computer program product may include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium may be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combinations of one or more programming languages, wherein the programming languages consist of object-oriented programming languages, and traditional procedural programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above, and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

What is claimed is:

1. A method, comprising:
   obtaining a command for calling a remote accelerated processing resource;
   determining, based on a type of the command, whether the command satisfies a given condition;
   in response to determining that the command satisfies the given condition, causing one of transmission and withholding transmission of the command to the remote accelerated processing resource; and
   in response to determining that the command fails to satisfy the given condition, causing the other of transmission and withholding transmission of the command to the remote accelerated processing resource.

2. The method of claim 1, further comprising:
   determining the type of the command, the type being at least one of: a first type for creating an object, a second type for setting a configuration, a third type for executing a computation, and a fourth type for deleting an object.

3. The method of claim 2, wherein determining whether the command satisfies the given condition further comprises:
   determining whether the command satisfies the given condition based on an unconfigured set and a configured set, the unconfigured set comprising at least an object which has been created and is unconfigured, and the configured set comprising at least an object which has been created and is configured.

4. The method of claim 3, wherein determining whether the command satisfies the given condition further comprises:
   in response to the command being the first type of command for creating an object:
     in response to the unconfigured set being empty, determining that the command fails to satisfy the given condition and causing transmission of the command to the remote accelerated processing resource; and
     in response to the unconfigured set not being empty, determining that the command satisfies the given condition and causing withholding transmission of the command to the remote accelerated processing resource.

5. The method of claim 3, wherein determining whether the command satisfies the given condition further comprises:
   in response to the command being the second type of command for setting a configuration:
     in response to a configuration to be set by the command being present in the configured set, determining that the command satisfies the given condition and causing withholding transmission of the command to the remote accelerated processing resource; and
     in response to a configuration to be set by the command being absent in the configured set, determining that the command fails to satisfy the given condition and causing transmission of the command to the remote accelerated processing resource.

6. The method of claim 5, further comprising:
   in response to a length of the configured set exceeding a predetermined threshold, removing a configuration which is unused by an object.

7. The method of claim 3, wherein determining whether the command satisfies the given condition further comprises:
   in response to the command being the third type of command for executing a computation, determining that the command fails to satisfy the given condition and causing transmission of the command to the remote accelerated processing resource; and
   in response to the command being the fourth type of command for deleting an object, determining that the command satisfies the given condition and causing withholding transmission of the command to the remote accelerated processing resource.

8. The method of claim 1, wherein the command is at least one of a remote procedure call and obtained from a neural network command set.

9. A device, comprising:
   a processing unit; and
   a memory coupled to the processing unit and storing instructions, the instructions, when executed by the processing unit, performing actions of:
     obtaining a command for calling a remote accelerated processing resource;
     determining, based on a type of the command, whether the command satisfies a given condition;
     in response to determining that the command satisfies the given condition, causing one of transmission and withholding transmission of the command to the remote accelerated processing resource; and
     in response to determining that the command fails to satisfy the given condition, causing the other of transmission and withholding transmission of the command to the remote accelerated processing resource.

10. The device of claim 9, wherein the instructions, when executed by the processing unit, further perform an action of:

determining the type of the command, the type being at least one of: a first type for creating an object, a second type for setting a configuration, a third type for executing a computation, and a fourth type for deleting an object.

11. The device of claim 10, wherein the action of determining whether the command satisfies the given condition further comprises:
   determining whether the command satisfies the given condition based on an unconfigured set and a configured set, the unconfigured set comprising at least an object which has been created and is unconfigured, and the configured set comprising at least an object which has been created and is configured.

12. The device of claim 11, wherein the action of determining whether the command satisfies the given condition further comprises:
   in response to the command being the first type of command for creating an object:
      in response to the unconfigured set being empty, determining that the command fails to satisfy the given condition and causing transmission of the command to the remote accelerated processing resource; and
      in response to the unconfigured set not being empty, determining that the command satisfies the given condition and causing withholding transmission of the command to the remote accelerated processing resource.

13. The device of claim 11, wherein the action of determining whether the command satisfies the given condition further comprises:
   in response to the command being the second type of command for setting a configuration:
      in response to a configuration to be set by the command being present in the configured set, determining that the command satisfies the given condition and causing withholding transmission of the command to the remote accelerated processing resource; and
      in response to a configuration to be set by the command being absent in the configured set, determining that the command fails to satisfy the given condition and causing transmission of the command to the remote accelerated processing resource.

14. The device of claim 13, wherein the instructions, when executed by the processing unit, further perform an action of:
   in response to a length of the configured set exceeding a predetermined threshold, removing a configuration which is unused by an object.

15. The device of claim 11, wherein the action of determining whether the command satisfies the given condition further comprises:
   in response to the command being a third type of command for executing a forward or backward computation, determining that the command fails to satisfy the optimization condition; and
   in response to the command being a fourth type of command for destroying an object, determining that the command satisfies the optimization condition.

16. The device of claim 9, wherein the command is at least one of a remote procedure call and obtained from a neural network command set.

17. A computer program product tangibly stored on a non-transient computer readable medium and comprising machine-executable instructions, the machine-executable instructions, when executed, causing a computer to perform steps comprising:
   obtaining a command for calling a remote accelerated processing resource;
   determining, based on a type of the command, whether the command satisfies a given condition;
   in response to determining that the command satisfies the given condition, causing one of transmission and withholding transmission of the command to the remote accelerated processing resource; and
   in response to determining that the command fails to satisfy the given condition, causing the other of transmission and withholding transmission of the command to the remote accelerated processing resource.

18. The computer program product of claim 17, further comprising:
   determining the type of the command, the type being at least one of: a first type for creating an object, a second type for setting a configuration, a third type for executing a computation, and a fourth type for deleting an object.

19. The computer program product of claim 17, wherein the step of determining whether the command satisfies the given condition further comprises:
   determining whether the command satisfies the given condition based on an unconfigured set and a configured set, the unconfigured set comprising at least an object which has been created and is unconfigured, and the configured set comprising at least an object which has been created and is configured.

20. The computer program product of claim 17, wherein the command is at least one of a remote procedure call and obtained from a neural network command set.

* * * * *